United States Patent [19]

Slodic

[11] Patent Number: 4,890,526
[45] Date of Patent: Jan. 2, 1990

[54] GLASS SCORING AND CUTTING APPARATUS

[76] Inventor: Kevin J. Slodic, 19007 Bella Dr., Cleveland, Ohio 44119

[21] Appl. No.: 181,171

[22] Filed: Apr. 13, 1988

[51] Int. Cl.⁴ .............................................. B26D 3/08
[52] U.S. Cl. ........................................ 83/886; 83/648
[58] Field of Search .................. 83/879, 880, 881, 882, 83/883, 884, 885, 886, 425, 437, 438, 648, 856, 887; 225/96

[56] References Cited

U.S. PATENT DOCUMENTS

| | | | |
|---|---|---|---|
| 868,656 | 10/1907 | Gramelspaches | 83/886 |
| 2,314,327 | 3/1943 | Drake | 83/886 |
| 3,570,336 | 3/1971 | Galla | 83/886 |
| 3,600,992 | 8/1971 | Dryon | 83/886 |
| 3,800,639 | 4/1974 | Restel | 83/886 |
| 3,812,748 | 5/1974 | Nausbaum | 83/886 |
| 4,437,376 | 3/1984 | Flint | 83/886 |
| 4,494,444 | 1/1985 | Masse | 83/886 |

*Primary Examiner*—Frank T. Yost
*Assistant Examiner*—Eugenia A. Jones

*Attorney, Agent, or Firm*—Leon Gilden

[57] ABSTRACT

A glass scoring and cutting apparatus is set forth wherein a selectively securable attachment bracket is securable to an existing work table, such as utilized with table saws, including a "rip fence". The "rip fence" utilized as a guide surface for a glass sheet wherein conjunction with a positionable glass cutter nestable within operating recesses of the bracket arrangement, the invention scores a sheet of glass that is manually and successively presented over the glass cutter. The bracket arrangement utilizes a plurality of clamps to secure a second part of the bracket arrangement to the work table with a dove-tail groove formed in the second part to accept a complementary dove-tail projection in a first part for vertical adjustment of the first part relative to the second part with a series of communicating recesses formed in the first part to accept a glass cutting tool for positioning the glass cutting tool in an aligned relationship with the work table's surface whereupon only the scoring wheel of the associated glass cutting tool projects above a plane defined by an upper surface of the work table.

8 Claims, 5 Drawing Sheets

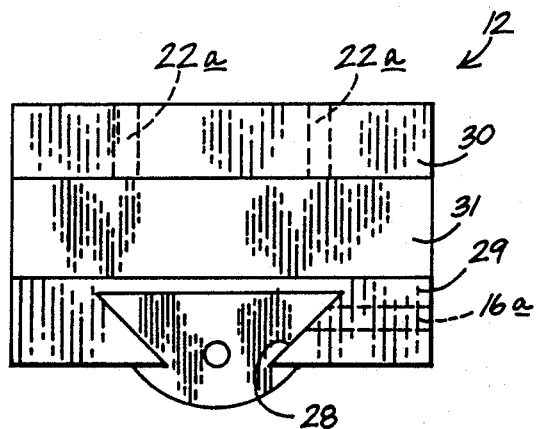
FIG. 5
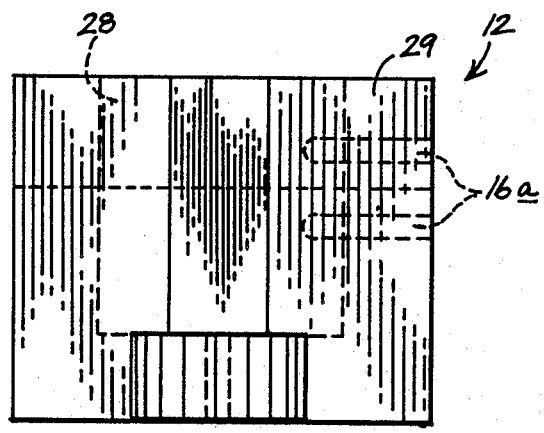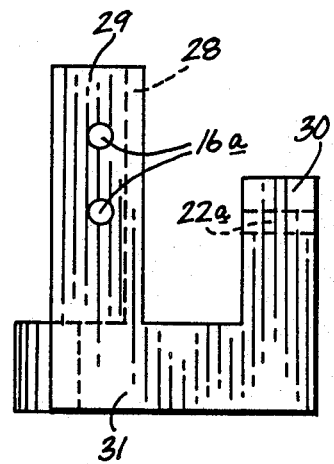
FIG. 6
FIG. 7
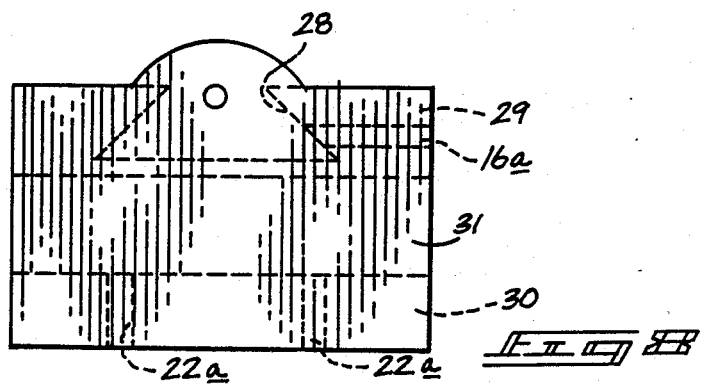
FIG. 8

GLASS SCORING AND CUTTING APPARATUS

BACKGROUND OF THE INVENTION

1. Field of the Invention

The field of invention relates to glass cutting tools, and more specifically pertains to a new and improved glass cutting apparatus for convenient and efficient use in combination with conventional "rip fences", as typically utilized in table saws and the like.

2. Description of the Prior Art

The use of glass cutting apparatus is well known in the prior art. Traditionally a sheet of glass is positioned on an underlying relatively planar support surface wherein by utilization of various straight edges positioned in an overlying relationship to the glass, a typical glass scoring tool is advanced along a predetermined score line whereupon the glass is and tapped beyond the score line to separate the glass at the score line.

The precision with which the glass is thereby scored is to a great extent determined by the skill and steadiness of an operator that must traditionally manipulate a guide over the glass and simultaneously manipulate the scoring tool therealong. Prior art devices that are of interest relative to the instant invention are exemplified in U. S. Pat. No. 868,656 to Gramelspacher, for example. The patent sets forth a grooving tool whereupon an overlying clamping structure has formed therein a guide groove for securement of a grooving tool that may be proceeded longitudinally of the work piece to groove the associated work piece. The patent is of interest relative to the general organization of a rotatably mounted tool proceeded longitudinally along a predetermined path of an associated work piece, but is of a relatively remote structure and function to the instant invention.

U. S. Pat. No. 2,314,327 to Drake sets forth a glass cutting apparatus wherein in a glass scoring tool is provided with an abutment surface to cooperate with a template positioned in overlying relationship to a glass plate to be scored. The Drake patent is also cited to note the use of typical glass scoring tools that are proceeded along a stationary glass plate to score and subsequently break same along a predetermined line.

U. S. Pat. No. 3,570,336 to Galla sets forth a glass cutting wheel holder for use in cooperation with conventional glass cutting machinery and is cited of interest relative to the manner in which a glass cutting wheel is selectively securable within a bracket-type arrangement, but is also of a remote structure and function to the instant invention.

U. S. Pat. No. 3,800,639 to Restel sets forth a glass cutting adjunct for use in combination with an associated radial arm saw wherein the radial arm saw carriage is proceeded along a predetermined path to score a stationary glass secured to a work surface of the radial arm saw. The Restel patent is of interest relative to the use of a conventional type glass cutting tool in use with a wood-cutting type organization.

U. S. Pat. No. 3,812,748 to Nausbaum sets forth a glass cutting device wherein a glass cutting wheel is interlockable with a central bridge member channel formed to a cutting support member. The bridge member has a distance marking description formed thereon and the cutter support is adapted to be engaged by a pointer member which will indicate a glass cutter position in respect to the bridge member. The patent is cited of interest as in previous patents in the use of a glass cutter tool selectively securable in a mounting bracket for the scoring and separation of glass.

The prior art has at this juncture provided various tools for the scoring and separation of stationary plate glass wherein the present invention departs from the organization of the prior art by providing a bracket securable to a conventional table saw provided with "rip fence" wherein a glass cutting tool is maintained at a stationary position relative to a sheet of glass manipulated past the tool.

As such, it may be appreciated that there is continuing need for a new and improved glass scoring and cutting apparatus which addresses both the problem of effectiveness and ease of use, and in this respect the present invention substantially fulfills this need.

SUMMARY OF THE INVENTION

In view of the foregoing disadvantages inherent in the known types of glass cutting tools now present in the prior art, the present invention provides an glass scoring and cutting apparatus wherein the same may be compactly stored when not in use and may then further easily and efficiently secured to an associated table saw type device and utilized in cooperation with an existing "rip fence" of the table saw. As such, the general purpose of the present invention, which will be described subsequently in greater detail, is to provide a new and improved glass scoring and cutting apparatus which has all the advantages of the prior art glass cutting tools and none of the disadvantages.

To attain this, the present invention comprises a two-part bracket with a first part securing a glass scoring tool selectively therein positionable by means of an associated dove-tail with a second part to orient the first part relative to the second part when said second is secured to an edge of an associated work table having formed thereto in a cooperating relationship a "rip fence" whereupon a top surface of the first part is positioned in upper surface of the associated work table such that the associated glass scoring tool, and more specifically its scoring wheel,is oriented at a vertical positioning above the aforenoted surface of the work table.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved glass scoring apparatus which has all the advantages of the prior art glass scoring apparatus and none of the disadvantages.

It is another object of the present invention to provide a new and improved glass scoring apparatus which may be easily and efficiently manufactured and marketed.

It is a further object of the present invention to provide a new and improved glass scoring apparatus which is of a durable and reliable construction.

An even further object of the present invention is to provide a new and improved glass scoring apparatus which is susceptible of a low cost of manufacture with regard to both materials and labor, and which accordingly is then susceptible of low prices of sale to the consuming public, thereby making such glass scoring apparatus economically available to the buying public.

Still yet another object of the present invention is to provide a new and improved glass scoring apparatus which provides in the apparatuses and methods of the prior art some of the advantages thereof, while simultaneously overcoming some of the disadvantages normally associated therewith.

Still another object of the present invention is to provide a new and improved glass scoring and cutting apparatus wherein a two-part clamp has selectively secured therein a glass scoring tool wherein the first part is oriented relative to the second part to position the glass scoring tool and more specifically the associated cutting wheel at an elevation somewhat above a working surface of the associated work table.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is top orthographic view of the second part of the instant invention with the interfitting dove-tailed first part and securement screws removed therefrom.

FIG. 6 is an orthographic view taken in elevation of the invention, as illustrated in FIG. 5.

FIG. 7 is a side orthographic view taken in elevation of the invention, as illustrated in FIG. 6.

FIG. 8 is a bottom orthographic view of the invention, as illustrated in FIG. 5.

DESCRIPTION OF THE PREFERRED EMBODIMENT

Figure 1:
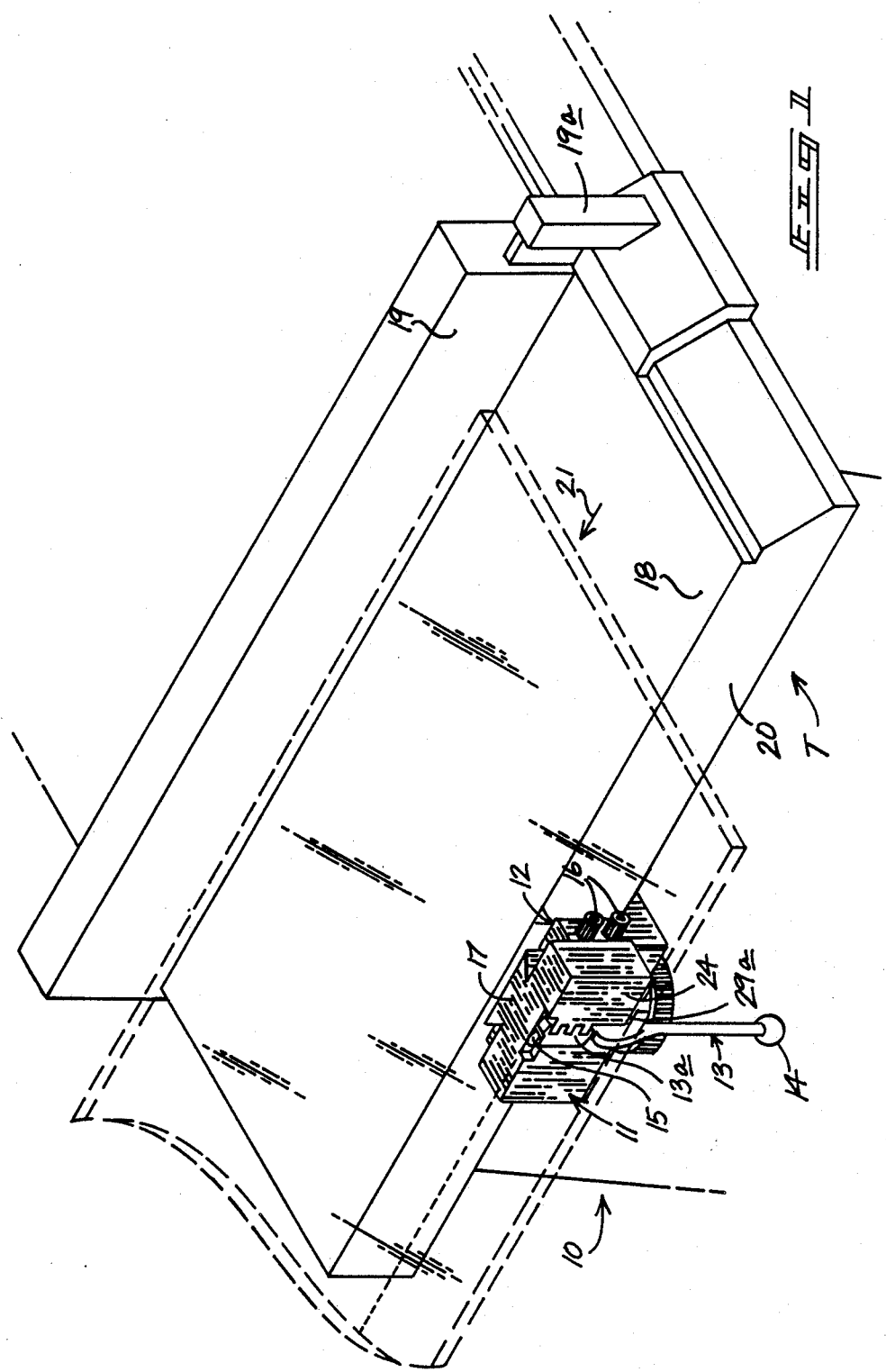
FIG. 1 is an isometric illustration of the instant invention secured to a conventional work table formed with an associated "rip fence".
Figure 2:
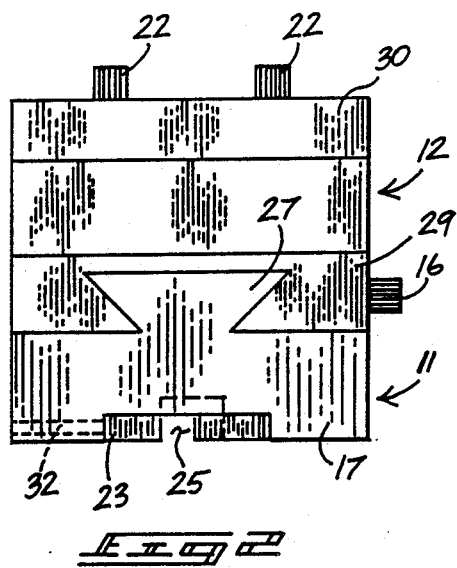
FIG. 2 is a top orthographic view of the instant invention.

With reference now to the drawings, and in particular to FIGS. 1 to 13 thereof, a new and improved glass scoring and cutting apparatus embodying the principles and concepts of the present invention and generally designated by the reference numeral 10 will be described.

More specifically, it will be noted that the glass scoring apparatus 10 essentially comprises a first part 11 vertically mounted for reciprocating movement relative to a second part 12 that is affixed to an associated table "T". Table "T" is of conventional construction, as is typically found in saw tables and the like, constructed with an associated "rip fence" 19 and a cooperating clamp 19 a to secure the "rip fence" along the upper surface 18 of the work table "T".

With particular reference to FIG. 1, it is noted that a conventional glass cutting tool 13 is formed with a conventionally configured head 13a positionable within a complementary recess within a forward face 24 of first part 11. Furthermore, consistent with conventional construction of such glass cutting tools, a weight striker 14 is formed at a terminal end of the handle of the glass cutting tool 13 with a glass scoring wheel 15 rotatably mounted in the head 13a. Lock screws (not shown) are positioned through a lateral face of first part 11 to secure the glass cutting tool 13 in position within the associated recesses of the first part 11 wherein the glass cutting tool is arranged such that glass scoring wheel 15 has its operative scoring edge in elevation above that of top surface 17, as is more clearly illustrated in FIGS. 3, 4, and 13. Top surface 17 of first part 11 is vertically oriented relative to second part 12 to position the top surface 17 in a coextensive relationship with top surface 18 of work work table "T" to orient the top surface 17 and upper surface 18 in a common plane. The first part 11 is secured in a predetermined position relative to second part 12 by use of lock screws 16 formed in a first leg 29 of second part 12, illustrated in FIG. 4, for example.

Figure 13:
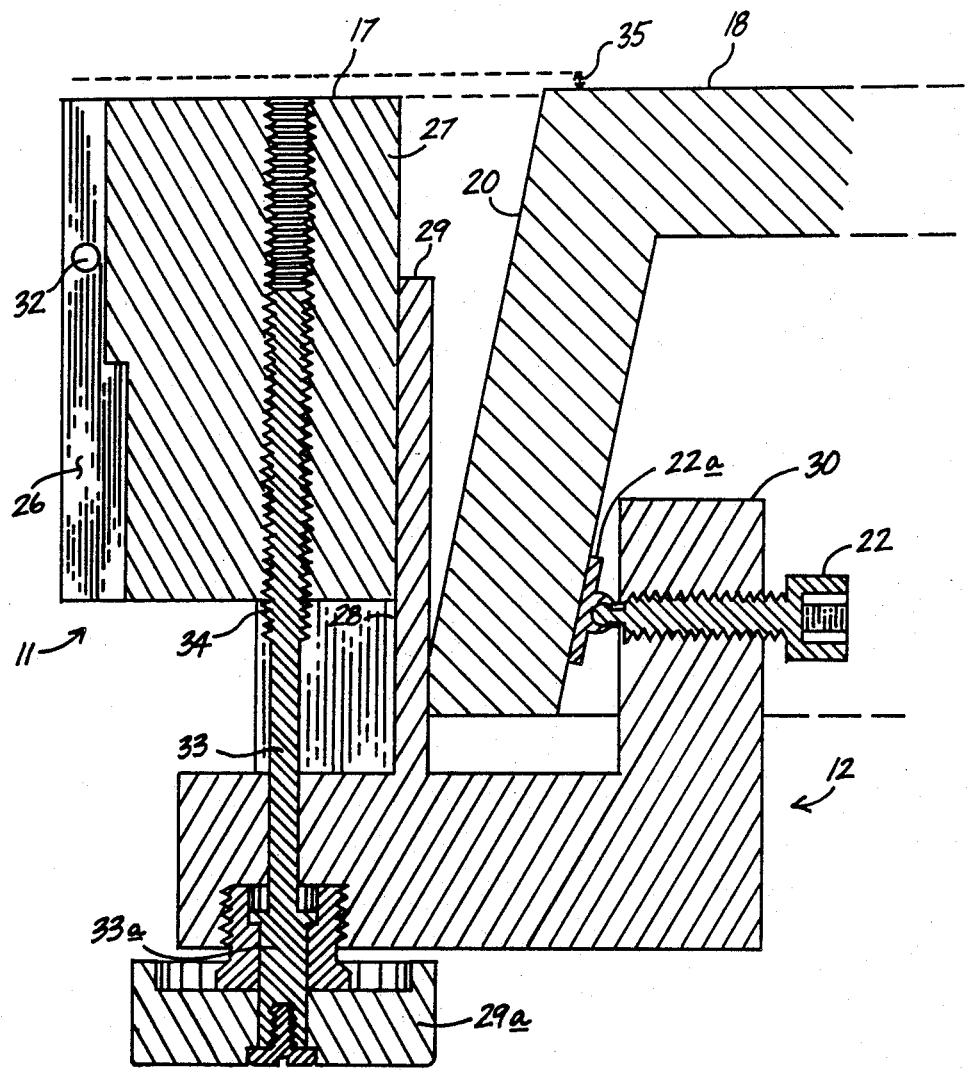
FIG. 13 is an orthographic view taken along the lines 13—3 of FIG. 3 in the direction indicated by the arrows.

With reference to FIGS. 1 through 4, edge surface clamping members 22 formed with clamping feet 22a are threadedly mounted to a second leg of second part 12 to fixedly secure second part 12 to a lateral side edge surface of work table "T", as illustrated in FIGS. 1 and 13.

Figure 3:
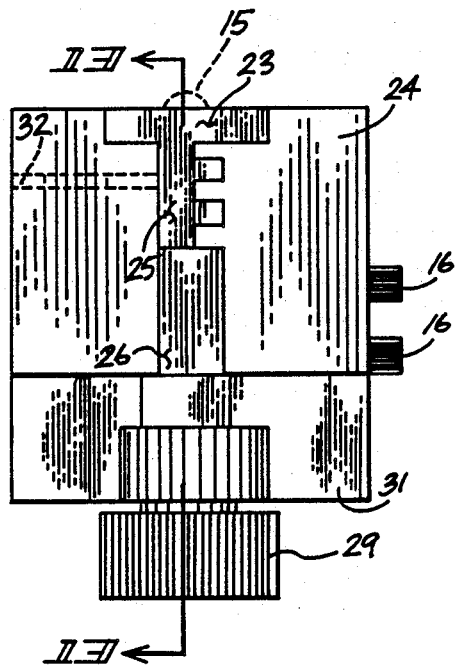
FIG. 3 is an orthographic view taken in elevation of the instant invention.
Figure 4:
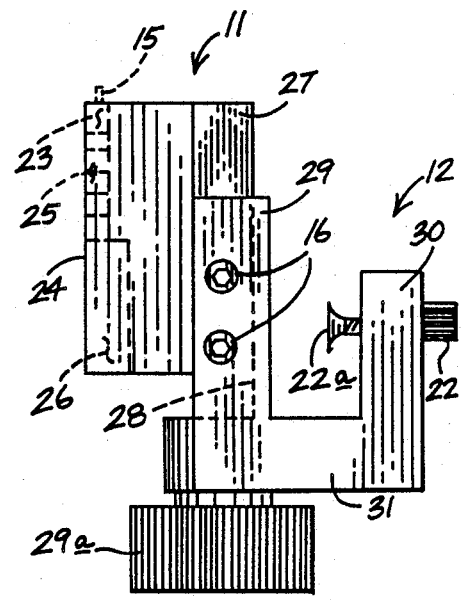
FIG. 4 is a side orthographic view of FIG. 3 taken in elevation.
Figure 9:
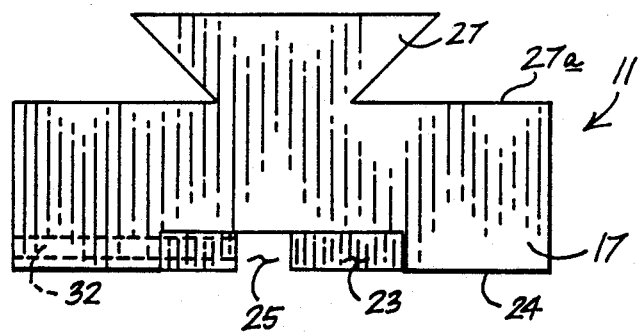
FIG. 9 is a top orthographic view of the first part of the invention for interfitting to the dove-tailed slot of the second part, as illustrated in FIG. 5.
Figure 10:
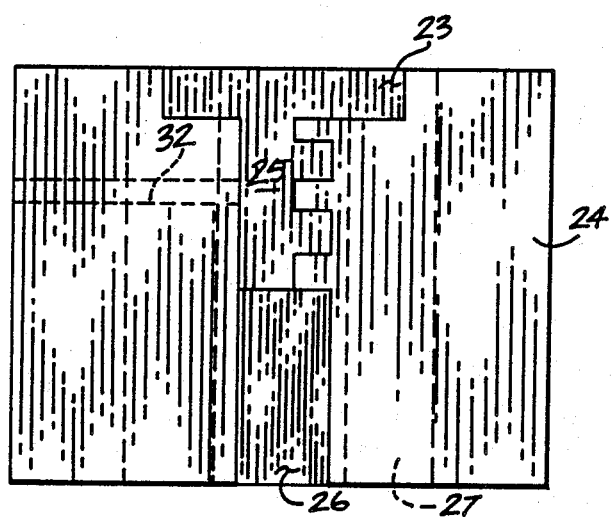
FIG. 10 is an orthographic view taken in elevation of the instant invention, as illustrated in FIG. 9.
Figure 11:
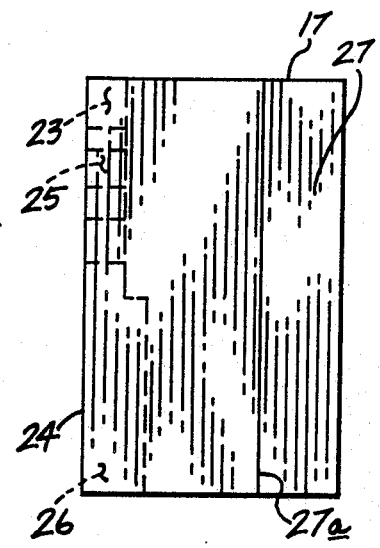
FIG. 11 is a side orthographic view taken in elevation of the invention, as illustrated in FIG. 10.
Figure 12:
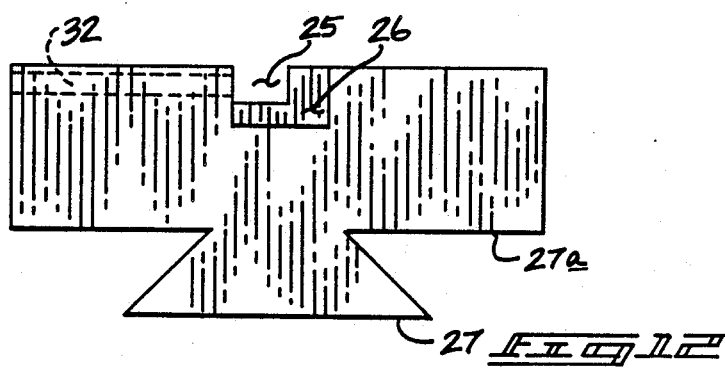
FIG. 12 is a bottom orthographic view of the invention, as illustrated in FIG. 11.

Reference to FIG. 3 illustrates a first elongate recess 23 oriented parallel to surface 17 and of a length substantially greater than that of the head 13a of glass cutting tool 13 to accept accumulation of glass dust and the like to accumulate in such recess and thereby prevent binding of the cutting wheel 15 in use. A second recess 25 is also formed in forward face 24 of first part 11 and is of a generally elongate structure orthogonal to the first elongate recess 23 to accept in complementary fashion the head 13a of the cutting tool 13. Communicating with the second recess 25 is a third recess 26 including a cavity of greater depth formed into the forward face of first part 11 to accept an associated handle of the conventional glass cutting tool 13.

Illustrated in FIGS. 1, 2, 4, and 9 for example, is a dove-tail 27 formed in first part 11 to cooperate to effect the aforenoted vertical adjustability of first part 11 with respect to second part 12. Reference to FIGS. 5 to 7 illustrates a first leg 29 of second part 12 accepting a plurality of threaded bores 16a to accept the lock screws 16 with a second leg 30 formed parallel to first leg 29 of a length somewhat less than first leg 29 to accept the clamping members 22 through associated threaded bores 22a. A connecting floor 31 provides for a generally "U" shaped member to accept first part 11 and enable clamping of the second part to an associated work table "T".

Reference to FIGS. 2, 3, 9, 10, 12 and 13 illustrates the threaded bore 32 to accept an associated set screw of similar construction to that of lock screw 16 to secure the glass cutting tool 13 within the aforenoted first, second, and third recesses.

Reference to FIG. 13 illustrates the glass scoring and cutting apparatus 10 secured to a lateral side edge surface 20 of work table "T" wherein it is illustrated that the top surface 17 is oriented and arranged relative to upper surface 18 of work table "T" to provide a generally coextensive planar arrangement between top surface 17 and upper surface 18.

Precise association of first part 11 to second part 12 is achieved by means of a finely threaded adjustment means including a rotatable knob 29a fixedly secured to an enlarge head 33a integrally formed to a reduced shank 33 terminating in a series of fine threads 34 communicating with complementary threads within first part 11. In this manner, the spacing indicated by arrow 35 of glass scoring wheel 15 is maintained at an elevation above that of upper surface 18 and top surface 17. The enlarged head 33a is rotatably formed to a threaded fastener (unnumbered) threaded into the floor 31 of second part 12 to maintain the shank and rotatable knob 29a in a fixed orientation and permit movement of first part 11 vertically relative to second part 12.

In use the apparatus 10 is secured to lateral side edge surface 20 by use of the clamping members 22 and thereafter rotatable knob 29a is manually rotated to orient top surface 17 to upper surface 18, as described. Thereafter, a sheet of glass, as illustrated in phantom in FIG. 1, is directed over the glass scoring wheel 15 in the direction of arrow 21 utilizing the "rip fence" 19 as a guide to effect a complete and thorough scoring of the glass. Thereafter the glass cutting tool 13 may be removed from its associated recesses within first part 11 and weight striker 14 may be implemented to strike the edge portion of the aforenoted scored glass to separate same from the sheet.

The manner of usage and operation of the instant invention should therefore be understood from the above description and accordingly no further discussion relative to the manner of usage will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A glass cutting apparatus for use in combination with a work table including a substantially horizontal planar upper surface, an elongate edge surface, and a planar guide surface positionable substantially parallel to said edge surface and substantially orthogonal to said upper surface wherein said apparatus comprises,
    a second part means including at least one clamping member for securement to said edge surface and reciprocatingly securing a first part means, and
    a first sliding member integrally formed to said first part means and a second sliding member integrally formed to said second part means wherein said first sliding member and said second sliding members are configured of complementary shapes for permitting vertical adjustment of said first part means to said second part means relative to said horizontal planar upper surface, and
    a recess means formed within a forward face of said first part means for securement of a glass cutting tool therein wherein said tool includes a rotary glass cutting wheel including a cutting edge projecting above said first part means when said glass cutting tool is secured within said recess means.

2. A glass cutting apparatus as set forth in claim 1 wherein said second part means defines a generally 'U' shaped member including a first leg having formed therein said second sliding member and a second leg having formed therethrough at least one threaded bore for accepting therethrough said clamping member.

3. A glass cutting apparatus as set forth in claim 2 wherein said second sliding member is a dove-tailed groove and said first sliding member is a dove tail extending along said first part means.

4. A glass cutting apparatus as set forth in claim 3 wherein a rotating adjustment means is secured to said second part means including a threaded rod extending through said second part means and into said first part means along an access parallel to said dove tail and dove-tail groove for adjustment of said first part means relative to said second part means.

5. A glass cutting apparatus as set forth in claim 4 wherein said recess means includes a first recess including a length generally parallel to a top surface of said first part means and a second elongate recess generally orthogonal to said first recess and directed into a third recess of a depth greater than said first and second recess.

6. A glass cutting apparatus as set forth in claim 5 wherein said second recess has directed thereto a threaded bore for accepting a clamping means for securing said glass cutting tool within said recess means.

7. A glass cutting apparatus as set forth in claim 6 wherein said second part means includes a plurality of bores directed through said dove-tail groove for clampingly securing said dove tail and said first part means in a preselected position.

8. A glass cutting apparatus as set forth in claim 7 wherein said glass cutting tool includes a handle means for positioning in said third recess and a head means for complementary positioning in said second recess, and wherein said rotary cutting tool of said cutting tool is positionable within said first recess.

* * * * *